(12) United States Patent
Gupta et al.

(10) Patent No.: US 12,488,544 B2
(45) Date of Patent: Dec. 2, 2025

(54) CALIBRATION FOR VIRTUAL OR AUGMENTED REALITY SYSTEMS

(71) Applicant: Magic Leap, Inc., Plantation, FL (US)

(72) Inventors: Ankur Gupta, Union City, CA (US); Mohamed Souiai, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 218 days.

(21) Appl. No.: 18/266,937

(22) PCT Filed: Dec. 21, 2021

(86) PCT No.: PCT/US2021/064655
§ 371 (c)(1),
(2) Date: Jun. 13, 2023

(87) PCT Pub. No.: WO2022/140419
PCT Pub. Date: Jun. 30, 2022

(65) Prior Publication Data
US 2024/0062482 A1    Feb. 22, 2024

Related U.S. Application Data

(60) Provisional application No. 63/129,316, filed on Dec. 22, 2020.

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/012* (2013.01); *G06T 7/70* (2017.01); *G06T 7/80* (2017.01)

(58) Field of Classification Search
CPC . G06T 7/70; G06T 7/80; G06T 19/006; G06F 3/012
See application file for complete search history.

(56) References Cited

U.S. PATENT DOCUMENTS 8,736,636 B2    5/2014  Kang
8,793,770 B2    7/2014  Lim
(Continued)

FOREIGN PATENT DOCUMENTS

JP    2016021097 A    2/2016
JP    2017108370 A    6/2017
JP    2020201587 A    12/2020

OTHER PUBLICATIONS

Office Action in Japanese Appln. No. 2023-537547, mailed on Dec. 19, 2024, 5 pages (with English translation).
(Continued)

*Primary Examiner* — Charles Tseng
(74) *Attorney, Agent, or Firm* — Fish & Richardson P.C.

(57) ABSTRACT

Techniques for addressing deformations in a virtual or augmented headset described. In some implementations, cameras in a headset can obtain image data at different times as the headset moves through a series of poses of the headset. One or more miscalibration conditions for the headset that have occurred as the headset moved through the series of poses can be detected. The series of poses can be divided into groups of poses based on the one or more miscalibration conditions, and bundle adjustment for the groups of poses can be performed using a separate set of camera calibration data. The bundle adjustment for the poses in each group is performed using a same set of calibration data for the group. The camera calibration data for each group is estimated jointly with bundle adjustment estimation for the poses in the group.

18 Claims, 5 Drawing Sheets

(51) Int. Cl.
    *G06T 7/70*         (2017.01)
    *G06T 7/80*         (2017.01)

(56)              References Cited

U.S. PATENT DOCUMENTS

| | | |
|---|---|---|
| 8,823,855 B2 | 9/2014 | Hwang |
| 8,874,673 B2 | 10/2014 | Kim |
| 10,705,598 B2 | 7/2020 | Steedly et al. |
| 2009/0237510 A1* | 9/2009 | Chen .................. G06V 10/147 |
| | | 348/149 |
| 2014/0347390 A1 | 11/2014 | Poulos et al. |
| 2017/0061693 A1* | 3/2017 | Kohler ................. G06T 19/006 |
| 2018/0329484 A1 | 11/2018 | Steedly et al. |
| 2019/0236405 A1 | 8/2019 | Dabeer et al. |

OTHER PUBLICATIONS

International Search Report and Written Opinion in International Appln. No. PCT/US2021/064655, mailed Mar. 24, 2022, 8 pages.
Extended European Search Report in European Appln. No. 21912060.7, mailed Oct. 18, 2024, 12 pages.
Grubert et al., "A Survey of Calibration Methods for Optical See-Through Head-Mounted Displays," IEEE Trans Vis Comput Graph, Sep. 2018, 24(9):2649-2662.
Hinzmann et al., "Robust map generation for fixed-wing UAVs with low-cost highly-oblique monocular cameras," Paper, Presented at Proceedings of the 2016 IEEE/RSJ International Conference on Intelligent Robots and Systems (IROS), Daejeon, South Korea, Oct. 9-14, 2016, pp. 3261-3268.

* cited by examiner

CALIBRATION FOR VIRTUAL OR AUGMENTED REALITY SYSTEMS

CROSS-REFERENCE TO RELATED APPLICATION

This application is a National Stage Application of International Application No. PCT/US2021/064655, filed Dec. 21, 2021, which claims priority to U.S. Provisional Patent Application No. 63/129,316 filed on Dec. 22, 2020, which is incorporated by reference in its entirety.

FIELD

This specification generally relates to image processing and sensor calibration.

BACKGROUND

Virtual or augmented reality (VAR) systems include display devices that can augment physical reality views with virtual content. The display devices can project images to a user using a display interface. In many systems, the displayed images are based on sensor data, such as image data from one or more cameras. However, if the sensors are miscalibrated or if the alignment of the sensors changes unexpectedly, the output image that is generated may not appear as desired.

SUMMARY

Innovative aspects of the subject matter described in this specification relate to calibration of devices used in VAR systems. In particular, when a VAR headset is worn by user, the headset may experience several thermal and mechanical deformations that can cause misalignment of cameras and other sensors on the headset. In some cases, these deformations can be temporary in nature or result small misalignments that previous calibration methods may not account for.

This disclosure describes systems and methods for addressing deformations to a VAR device using a bundle adjustment technique that includes continuous calibration to compensate for elastic or temporary deformations to the device during use. The calibration can be performed concurrently with operation of VAR device to capture sensor data and provide output to a user, e.g., with calibration taking place in real time or substantially in real time as the user uses the device. In this technique, image data is collected along with sensor data indicative of the alignment and orientation of the cameras or other sensors of a headset system. The headset system can collect the image data as the headset moves through a series of poses while also monitoring conditions to determine if a miscalibration condition has occurred. As the headset moves, the system processes groups of the received image data, with the calibration parameters being potentially adjusted or refined for each group. The occurrence of miscalibration conditions can be used to define the boundaries for the groups. For example, if a miscalibration condition occurs, the headset system ends the current group and begins a new group of data for processing. This allows the collected data for poses that share the same physical sensor alignment to be processed in the same group, using predetermined criteria such as the timing of the miscalibration condition to set the beginning and/or end of the group. The system determines extrinsic parameters representing the positions of the sensors for each group of device poses. The pose information, extrinsic parameters, and reference image points are used to perform error optimization and calibrate the headset according to the results of the error optimization.

According to implementations described, a calibration method can be used to accommodate deformations in VAR headsets. In some implementations, the method includes obtaining image data from each of a plurality of cameras of a headset. Image data is obtained at different times as the headset moves through a series of poses of the headset. The method also includes detecting that one or more miscalibration conditions for the headset have occurred as the headset moved through the series of poses, dividing the series of poses into groups of poses based on the one or more miscalibration conditions, and performing bundle adjustment for the groups of poses using a separate set of camera calibration data for each group of poses. The bundle adjustment for the poses in each group is performed using a same set of calibration data for the group. The camera calibration data for each group is estimated jointly with bundle adjustment estimation for the poses in the group. One or more of the alignment and orientation of one or more of the plurality of cameras is changed based on the bundle adjustment to calibrate the headset.

Implementations can each optionally include one or more of the following features. For instance, in some implementations, obtaining the image data at different times as the headset moves through the series of poses of the headset includes determining position and orientation values for each camera of the headset relative to a map reference point for each pose of the headset.

In some implementations, obtaining the image data at different times as the headset moves through the series of poses of the headset includes determining a pose of the headset for each selected frame of image data, and selecting a subset of poses as the series of poses.

In some implementations, detecting that the one or more miscalibration conditions for the headset have occurred includes one or more operations. These operations include (i) determining that a headset has been placed on or taken off of a user's head; (ii) determining that a location of the headset has changed; (iii) detecting a fluctuation in an ambient temperature surrounding the headset; (iv) detecting a fluctuation in a temperature of the headset; and (v) detecting a mechanical displacement of a portion of the headset.

In some implementations, dividing the series of poses into the groups of poses includes determining a first time that a first miscalibration condition occurred, identifying all poses of the headset prior to the first time when the first miscalibration condition occurred, and grouping the poses of the headset prior to the first time into a first pose group.

In some implementations, dividing the series of poses into the groups of poses includes determining a second time that a second miscalibration condition occurred, identifying all poses of the headset after the first time and prior to the second time when the second miscalibration condition occurred, and grouping the poses of the headset between the first time and the second time into a second pose group.

In some implementations, a number of poses in the second pose group is different from a number of poses in the first pose group.

In some implementations, performing bundle adjustment for the groups of poses using a separate set of camera calibration data for each group of poses includes determining a separate extrinsic parameter for each group of poses. The separate extrinsic parameter includes at least two matrices of rotation and translation parameter values associated with at least two cameras of the headset.

In some implementations, performing bundle adjustment for the groups of poses using a separate set of camera calibration data for each group of poses includes optimizing the separate set of camera calibration data for each group of poses to align the headset to a set of mapping reference points in an augmented reality image.

In some implementations, optimizing the separate set of camera calibration data for each group of poses includes applying a first constraint that limits a difference between rotation parameters of the camera calibration data of two groups of poses to be less than a rotation threshold, and applying a second constraint that limits a difference between translation parameters of the camera calibration data of two groups of poses to be less than a translation threshold.

In some implementations, the rotation threshold is 2 arc minutes, and the translation threshold is 3 mm.

In some implementations, the method includes displaying an augmented reality image at a display of the headset in response to performing the bundle adjustment.

Aspects of the subject matter described in this specification also include a virtual or augmented reality system that includes a headset and a processor. The headset includes a display device configured to display an augmented reality image and cameras configured to obtain data for rendering the augmented reality image. The processor is coupled to the headset and is configured to obtain image data from each of the cameras of the headset. Image data is obtained at different times as the headset moves through a series of poses of the headset. The processor is also configured to detect that one or more miscalibration conditions for the headset have occurred as the headset moved through the series of poses, divide the series of poses into groups of poses based on the one or more miscalibration conditions, and perform bundle adjustment for the groups of poses using a separate set of camera calibration data for each group of poses. The bundle adjustment for the poses in each group is performed using a same set of calibration data for the group. The camera calibration data for each group is estimated jointly with bundle adjustment estimation for the poses in the group. One or more of the alignment and orientation of one or more of the cameras is changed based on the bundle adjustment to calibrate the headset.

Aspects of the subject matter described in this specification also include a non-transitory computer-readable storage medium comprising instructions, which, when executed by one or more processors, cause the one or more processors to perform operations. The operations include obtaining image data from each of a plurality of cameras of a headset. Image data is obtained at different times as the headset moves through a series of poses of the headset. The operations also include detecting that one or more miscalibration conditions for the headset have occurred as the headset moved through the series of poses, dividing the series of poses into groups of poses based on the one or more miscalibration conditions, and performing bundle adjustment for the groups of poses using a separate set of camera calibration data for each group of poses. The bundle adjustment for the poses in each group is performed using a same set of calibration data for the group. The camera calibration data for each group is estimated jointly with bundle adjustment estimation for the poses in the group. One or more of the alignment and orientation of one or more of the plurality of cameras is changed based on the bundle adjustment to calibrate the headset.

The described calibration techniques are advantageous in that they can rapidly respond to deformations and apply calibration to compensate for small and reversible deformations. By repeatedly performing calibration with groups of image data, the effect of deformations on rendered VAR output images can be minimized, thereby improving the user's viewing experience. Furthermore, calibration can be performed in real time without being detected by a user.

The system can provide high efficiency by sharing calibration parameters for groups of captured image data, while providing high accuracy and versatility by allowing for dynamically-sized groups. The sharing of calibration parameters limits the overall computational requirements by reducing the complexity and number of times that calibration occurs. The ability to adjust the size of the groups based on detected conditions can align the groups to portions of data capture representing a particular physical alignment of the sensors. For example, for a series of image captures, the data can be grouped so that a first group includes captures with a first physical relationship between the cameras, a second group includes captures with a second physical relationship between the cameras (e.g., after a force slightly deforms the headset), and a third group includes captures with a third physical relationship between the cameras (e.g., after the force subsides and the headset at least partially returns to its unloaded state). The calibration can be optimized for each group, so that calibration is adjusted for different alignments of the cameras, while avoiding many unnecessary calibration processes at times when the alignment has not changed. The ability to change the size of the groups of image data processed (e.g., whether in terms of number of image captures, number of device poses, or amount of time represented) allows the system to respond to many different situations and adjust the frequency of calibration processing with the frequency that deformations to the headset occur.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A VAR system generally includes a headset worn on a user's head. To improve user experience, there has been a demand in the market for lighter and more flexible frame structures for the headsets. However, lighter and more flexible frame structures are also more susceptible to deformations.

In general, frame structures can undergo three types of deformations. Plastic deformation can occur when a frame structure is dropped, mishandled, or experiences wear and tear. Plastic deformations are generally not reversible, or at least are not reversed on their own without repair or other adjustment. Thermal deformation can occur due to temperature fluctuations. Thermal deformations are generally reversible, so that even if a temperature change alters sensor alignment the device resumes the proper alignment after the temperature returns to normal. Mechanical load deformation can occur due to various factors such as cable tugs or headset donning. Mechanical load deformations are generally small and reversible and last for a short period of time. As with thermal deformations, mechanical load deformations are usually reversed automatically after the external load is removed. Due to the sensitivity and precision of VAR systems, any one of these types of deformations has the potential to degrade the quality of output of the VAR system. When two or more of these deformations occur concurrently, the deformations can amplify and introduce significant variations in image quality and consequently user experience of the VAR system.

For example, if two cameras are not aligned along roll-axis or the yaw-axis, the misalignments can affect the image processing and result in output images that have translational and/or rotational misalignments between the presented virtual content and the real environment that a user views. For example, in augmented reality images, virtual items may appear at incorrect positions with respect to real, non-virtual objects the user sees. Misalignments resulting in inconsistent display outputs can also cause physiological strain on the eyes of a user. Furthermore, and more generally, human beings can be sensitive to binocular rotational misalignment of virtual images about the Pitch, Roll, and Yaw axes down to 4, 6, and 10 arcminutes, respectively. To address this problem, the misalignment of cameras and/or sensors on a headset can be estimated and compensated. The calibration of cameras and other sensors can be performed jointly with bundle adjustment processing to increase the accuracy and usability of image processing by the system.

This disclosure describes calibration methods and systems to correct misalignments that can occur due to deformations, and in particular elastic deformations, which can include thermal and mechanical load deformations and which may occur frequently or vary in magnitude during use of a headset.

Figure 1:
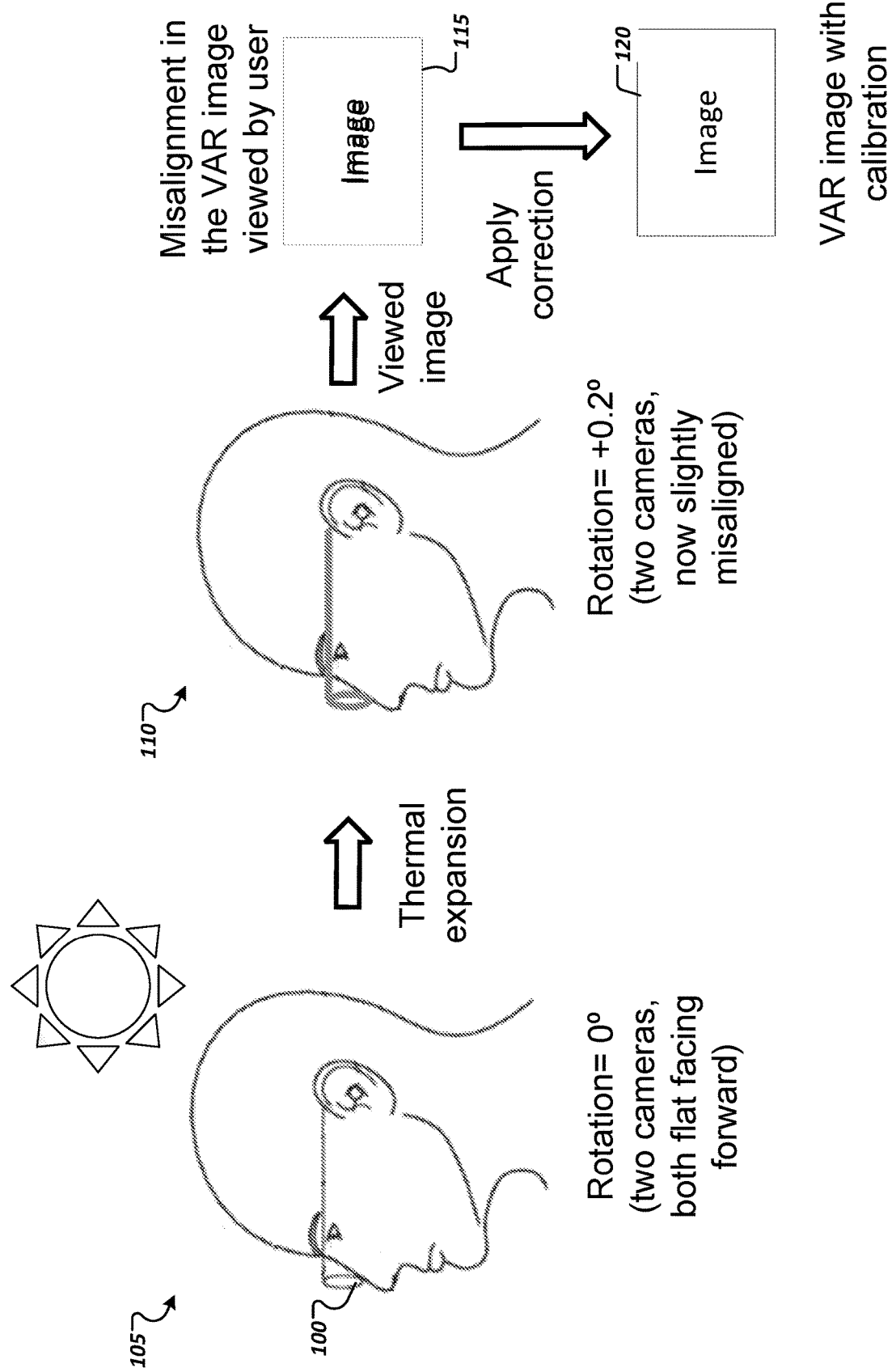
FIG. 1 depicts an example scenario in which sensor calibration for a VAR system is implemented.

Referring to FIG. 1, in scenario 105, a user is wearing a VAR headset 100 on his head. The headset 100 includes multiple cameras facing forward to capture the environment being viewed by the user. In scenario 105, the cameras on headset 100 can initially be aligned such that the VAR system renders images on the headset 100 display without any misalignments.

After a period of exposure to environmental elements such as the sun, the headset 100 can heat up and can undergo thermal expansion causing the cameras to be slightly misaligned. For example, one or both cameras can be offset by a rotation angle of 0.2° as in scenario 110. When such elastic deformations occur, the quality of the rendered VAR image can be compromised. For instance, as shown in FIG. 1, due to the deformation, image 115 includes one or more objects that have compromised quality and may not be viewed clearly by a user, or the objects may be displayed at inaccurate positions with respect to objects the user sees in the real-world environment.

To address elastic deformations and to avoid the resulting compromised image quality, a sensor calibration and bundle adjustment method (SCBA) can be performed. Details of the SCBA method are described with respect to FIGS. 2 to 5. SCBA can be performed periodically, at scheduled or predetermined intervals, in response to miscalibration triggers, in response to a condition, or in response to a user request. Various suitable conditions can be used to determine when to perform the SCBA method. Examples include, but are not limited to, when the eyes of a user wearing the headset are closed, when the user is asleep, or when the headset system has available resources to perform SCBA.

As a result of the various compensation techniques can be applied to the headset 100 to account for the elastic deformations and resulting misalignments. For example, the display of virtual content (e.g., it's location or size) may be adjusted based on the calibration values determined by the SCBA method. In another example, the orientation or alignment of sensors or cameras on headset 100 can be adjusted or compensated. Such calibration and compensation of the headset 100 can be performed continuously or periodically so that virtual content is displayed at a position in the display of the headset 100 that correctly aligns the virtual content with real world content viewed through the headset 100. In this manner, the rendered images 120 can be minimally impacted by alignment issues and can be rendered at a higher quality level.

Figure 2:
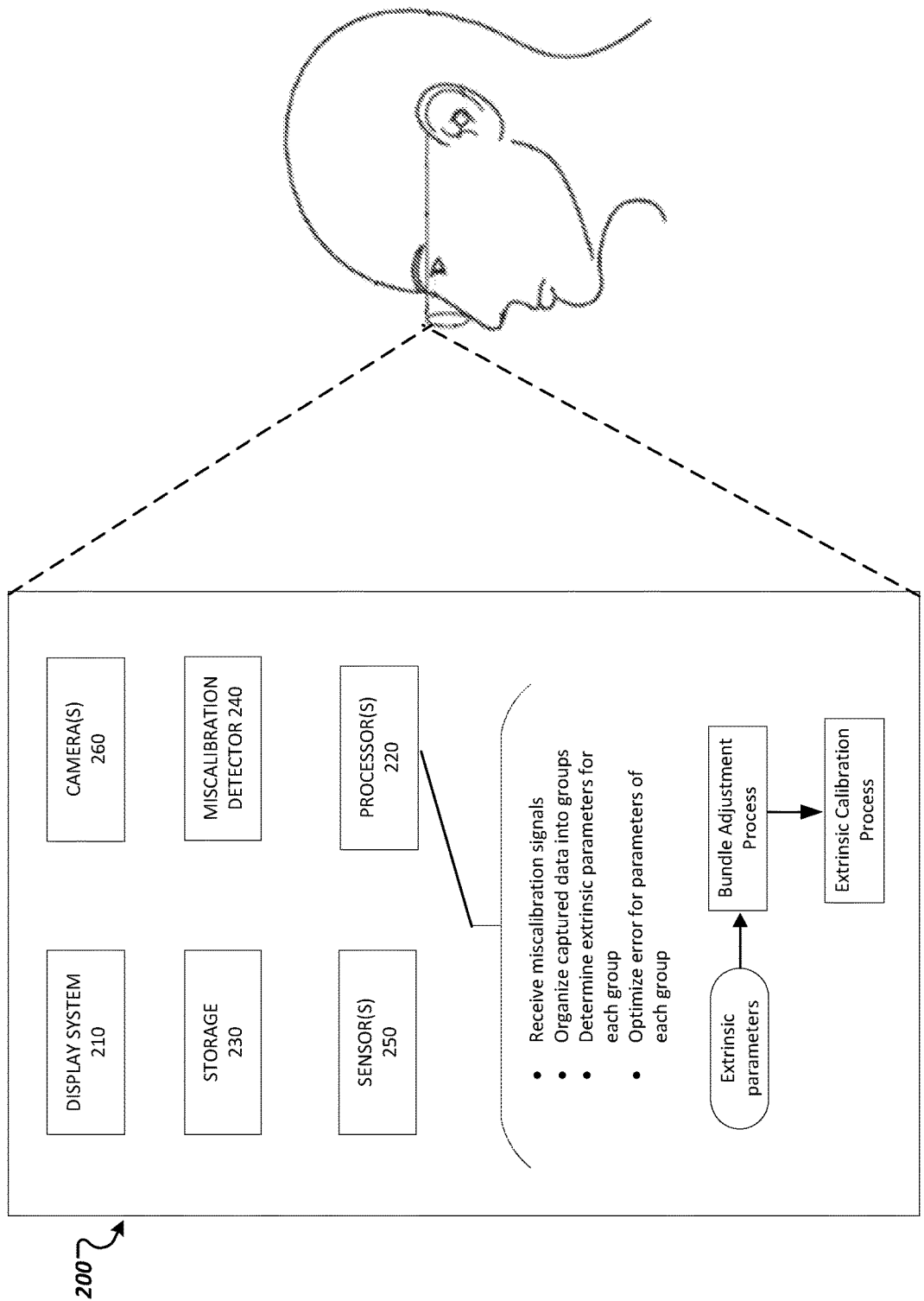
FIG. 2 depicts an example system for implementing sensor calibration jointly with bundle adjustment to compensate for elastic deformations.

FIG. 2 depicts an example headset system 200 for implementing SCBA. The headset system 200 includes a frame structure (not shown), a display system 210, one or more processors 220, storage 230, a miscalibration detector 240, one or more sensors 250, and one or more cameras 260. The display system 210, one or more processors 220, storage 230, miscalibration detector 240, one or more sensors 250, and one or more cameras 260 may be integrated into or coupled to the frame structure.

In general, the headset system 200 is a device that uses cameras or other sensors to acquire information about the three-dimensional environment around a user wearing the headset system 200 and to add digital elements on a screen, a virtual retinal display, or other display technology. For example, the headset system 200 or associated electronics can use information from multiple cameras and sensors to determine the positions of real-world objects, map the sizes and positions in three-dimensional space, and generate and present three-dimensional computer-generated imagery integrated into a view of the environment. This process is performed in a real-time manner, so that the computer-generated imagery integrates with or is shown in alignment with the user's current view.

For example, as the wearer of the headset system 200 moves his or her head to view a different portion of a room, the display of digitally-generated elements is adjusted to maintain their appropriate apparent position within the room. The process of generating and displaying imagery to appear to be at the correct spatial position is highly dependent on the correct alignment of the cameras or other sensors that provide data to generate the map of the environment and determine the current position of the headset system 200 within the environment. As a result, incorrect alignment or orientation of a camera or sensor, whether due to deformation of the headset system 200 or another cause, can degrade the quality of a user's experience with the headset system 200. For example, digitally-added imagery can be displayed at incorrect or inconsistent positions with respect to the real-world environment.

The display system 210 is configured to present the user's eyes with photo-based radiation patterns that can be comfortably perceived as augmentations to physical reality, with high quality two-dimensional (2D) or three-dimensional (3D) image content. The display system 210 can include a screen, a virtual retinal display, or other suitable content display technology, and can output a sequence of frames at a high frequency to provide the perception of a single coherent scene. The display system 210 can include a left eyepiece, a right eyepiece, a left projection system, and a right projection system.

The left and right eyepieces can be partially transparent and can effectively operate as display screens or display interfaces when an image is projected onto them. In some implementations, the left and right eyepieces can be optical see-through displays through which the user can directly view light from real objects via a transparent (or semi-transparent) element. The transparent element can superimpose light from the left and right projection systems over the user's view of the real world. The eyepieces are placed in front of the user's eyes.

The left and right projection systems can project left and right images on to the left and right eyepieces, respectively. The projection systems can be implemented as an optical fiber scan-based projection device.

Storage 230 can store any suitable data for the headset system 200. For example, storage 230 can store computer programs, code, applications, software, or data that can be used by one or more components of the headset system 200 to facilitate operations of the headset system 200 such as the SCBA method described in this specification. In some implementations, audiovisual data to be rendered on the display system 210 can be stored, at least temporarily, in storage 230. Storage 230 can include one or more frame buffers 118 and a 3D database 120 for storing three-dimensional scene data. Storage 230 can be implemented in various suitable ways including for example, optical and memory chips. Storage 230 can include a computer-readable medium or media, a volatile memory unit or units, or a non-volatile memory unit or units.

One or more sensors 250 can be mounted to the frame of the headset system 200 to sense the movement of the user's head and/or the eye position and inter-ocular distance of the user. The one or more sensors 250 can include, but are not limited to, inertial measurement units, orientation sensors, accelerometers, compasses, gyroscopes, light sensors, microphones, and/or touch sensors. The one or more sensors 250 can provide data indicative of the alignment or orientation of one or more components of the headset system 100 such as the one or more cameras 260. For example, the sensors 250 can detect rotation and orientation settings such as the roll, pitch, and yaw values of the cameras 260. The sensors 250 can collect sensor data continuously, periodically, or when instructed to by a processor. The microphones can obtain audio data indicative of sounds in the environment surrounding the user.

One or more cameras 260 can capture image data of the environment surrounding the user. For example, the cameras 260 can capture one or more views corresponding to images the user perceives. The cameras 260 can be integrated with or coupled to audio sensors such as microphones. Image data captured by the one or more cameras 260 can be provided to other components of the headset system 200 such as the one or more processors 220 and storage 230 or a server. In some implementations, the image data 110 is obtained as a video feed, such as a sequence of images. For instance, the image data 110 can be an image frame in a video sequence. The image data from the cameras 260 can be represented as values for pixels. In the frame of reference of the headset 102, the cameras 260 show images with pixel values for horizontal and vertical axes (e.g., x dimension and y dimension).

The miscalibration detector 240 is configured to detect one or more miscalibration conditions. A miscalibration condition can be a condition that corresponds to or indicates that components of the headset system 200 such as one of the cameras 260 or sensors 250 are not aligned. Examples of events that can lead to a miscalibration condition occurring include, but are not limited to, when one or more cables pull down on the headset, when a thermal fluctuation occurs, when a headset system 200 is displaced greater than a threshold distance or is moved beyond a particular location, or when a user puts on or takes off the headset system 200.

In some implementations, the miscalibration detector 240 can be coupled to one or more of the sensors 250 or cameras 260 and can receive data from the sensor(s) 250 and/or camera(s) 260. Based on the data received from the sensor(s) 250 and/or camera(s) 260, the miscalibration detector 240 can determine whether a miscalibration condition exists or not. Upon determining that a miscalibration condition exists, the miscalibration detector 240 can generate a miscalibration signal and transmit it to a processor. In some implementations, the miscalibration detector 240 may be integrated with a processor such that the processor performs at least the operations of the miscalibration detector 240.

The headset system 200 is not limited to the components noted above and can include various other circuitry such as, e.g., one or more speakers to emit audio signals, communications interface to facilitate wireless communications between the headset system 100 and other electronic devices such as servers, databases, and computing systems.

The headset system 200 can also include one or more processors 220. The processors 220 can include a central processing unit (CPU), a graphics processing unit (GPU), a controller, a digital signal processor, an application specific integrated circuit (ASIC), a programmable gate arrays (PGA), a field PGA (FPGA), and/or a programmable logic controller (PLC). The processors 220 can include various software and hardware components to control the overall operation of the headset system 200 and perform the operations described in this specification.

The processors 220 can include a GPU that renders frames (e.g., translating a 3D scene into a 2D image) and can provide the rendered frames to a buffer or for storage in storage 230. The GPU can read into and/or out of one or more frames from a frame buffer. The GPU can provide image or frame data to left and right projection subsystems of the display system 210.

The processors 220 can also execute one or more operations of the SCBA method. For example, as explained in more details with respect to FIGS. 3-5, the processors 220 receive video data from the cameras 260, sensor data from the sensors 250, and miscalibration signals from the miscalibration detector 240. The processors 220 can organize the data into groups, determine extrinsic parameters for each group, and optimize the error for each group based, in part, on the extrinsic parameters. Using the optimized parameters, the processors 220 can calibrate one or more components of the headset system 200, e.g., by sending one or more control signals to the cameras 260 to adjust their orientation and alignment. By adjusting the orientation and alignment of the cameras 260, image degradation due to elastic deformations can be compensated and the user can view images that are not degraded due to deformations. In some implementations, control signals can also be sent to the left and right projection subsystems of the display systems to ensure alignment of displayed images is correct and minimally impacted by any miscalibration condition.

Figure 3:
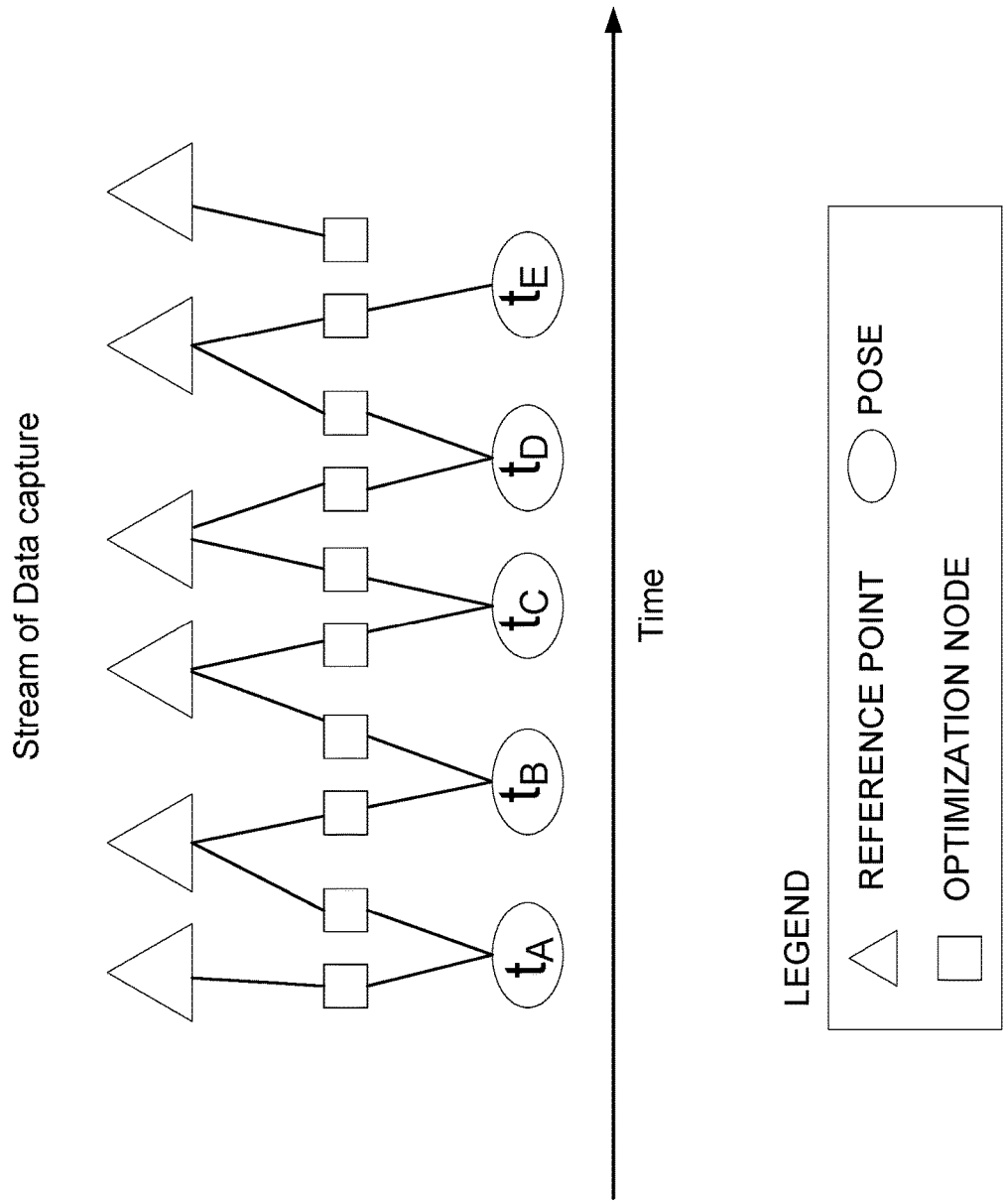
FIG. 3 depicts an example graphical representation of pose and reference mapping points.

In more detail, FIG. 3 illustrates a graphical model representing data collected by one or more processors (hereinafter referred to as "processor") in a headset system from the cameras and/or sensors. In FIG. 3, the triangles represent reference points corresponding to 3D image points. The ovals represent camera poses of the headset. The squares represent optimization nodes that include optimization values for optimizing camera poses for each reference point associated with an optimization node.

Pose information, e.g., camera position and orientation information, can be obtained from the sensors and/or cameras and can be determined for every frame, for e.g., at a 30 Hz or 60 Hz frequency. A determined number of poses, e.g., one or two determined poses, can be selected for a predetermined period of time and utilized for purposes of generating the graphical model and performing SCBA.

In some implementations, pose, optimization, and reference point data can be obtained on a continuous or periodic basis. In some implementations, pose, optimization, and reference point data can be obtained for a fixed period of time. FIG. 3 illustrates an example in which data is obtained from a time period between time $t_A$ and $t_E$. At time $t_A$, the two left-most reference points are the available reference mappings points. Pose information, represented by oval $t_A$, for these points is obtained and optimization values for the two reference points based on the pose information can be determined. Similarly, at times $t_B$, $t_C$, $t_D$, and $t_E$, pose, reference point, and optimization data can be determined.

While the above noted data is being collected, the headset system can also be monitoring instances of miscalibration. The processor can receive a miscalibration signal from the miscalibration detector in response to the miscalibration detector determining that a miscalibration condition has occurred, as described above. In some implementations, the processor may incorporate the miscalibration detector and can perform the miscalibration detection operations.

In addition to miscalibration instances, the processor may also keep track of the availability of the headset system resources and when a threshold amount of computational resources are available, the processor may generate a calibration trigger signal indicating that the SCBA method should be performed. Computational resources may refer to storage and processor resources and their capacities to store and process a threshold amount of data for performing SCBA. In some cases, the computational or storage resources can set practical limits such that only a certain number of data points or data for a certain amount of time can be utilized to perform SCBA.

The processor may also identify time periods that are preferred to perform calibration and generate a calibration trigger signal when such times are available. For example, based on data received from sensors and/or cameras of the headset system, the processor may determine that the user's eyes are currently closed or have been closed for a threshold period of time. In response to determining that the user's eyes are currently closed or have been closed for a threshold period of time, the processor can generate a calibration trigger signal indicating that an SCBA method should be performed.

In general, a calibration trigger signal can be generated in response to various configurable settings and conditions. For example, the processor can be configured to generate a calibration trigger signal in response to a user input indicating that the user would like to calibrate the headset system. In another example, the processor can be configured to automatically generate a calibration trigger signal after a certain period of time has elapsed, at scheduled times, or after a certain amount of data has been obtained from the sensors and/or cameras.

In response to the miscalibration signal or the calibration trigger signal, the processor can divide the poses and nodes shown in FIG. 3 into groups. The grouping of data can be based on the miscalibration triggers or a threshold limit on the maximum size of a group. For example, if the group limit is three poses, then the first three poses (e.g., poses $t_A$, $t_B$, $t_C$ and related optimization nodes and reference points in FIGS. 3 and 4) are grouped together in a first group "Group 1," and the next set of three or less poses (e.g., poses $t_D$ and $t_E$ and related optimization nodes and reference points in FIGS. 3 and 4) are grouped together in a second group "Group 2."

As another example, if a first miscalibration trigger was detected after time $t_C$, then the processor may group all the data received prior to the first miscalibration trigger into one group and data received after the first miscalibration trigger and a second miscalibration trigger in a second group.

Figure 4:
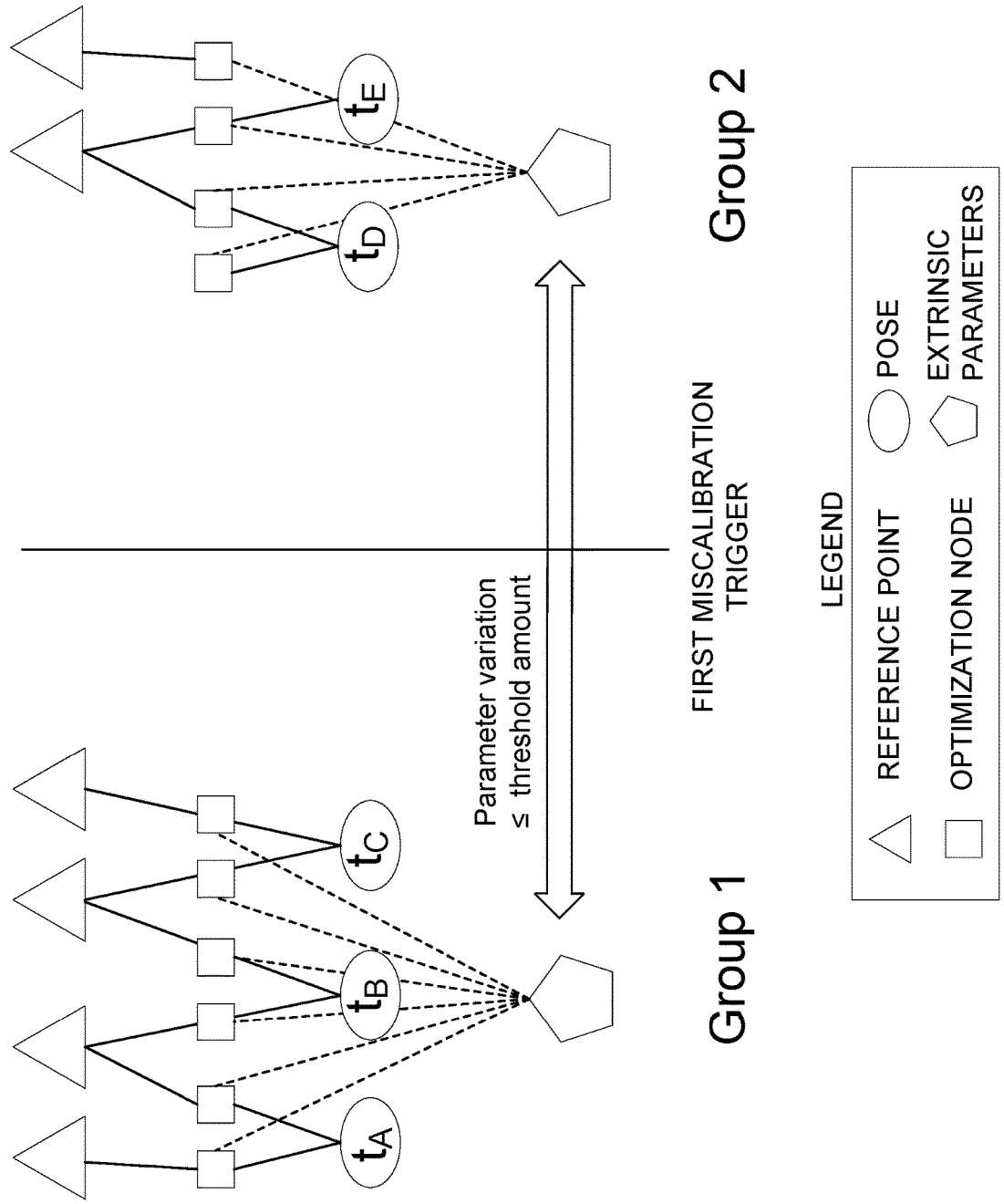
FIG. 4 depicts an example grouping of parameters based on a miscalibration trigger.

Extrinsic parameters are determined for each group using data from the sensors and/or cameras. The extrinsic parameters are represented by the pentagon shape symbols and are linked to the optimization nodes as shown in FIG. 4. The extrinsic parameters can be used to compensate for errors arising out of misalignments and elastic deformations.

The extrinsic parameters can include one or more matrices of rotation and translation parameters. The extrinsic parameters can provide the "6 degrees of freedom" information, i.e., three rotation parameters and three translation parameters, and can account for any deformations that have occurred and may result in misalignments. In some implementations, the matrices can include two matrices indicative of the position and orientation of a left camera and a right camera on the headset system with respect to a center position or central camera of the headset system.

In some implementations, the difference between respective extrinsic parameters for successive groups can be bound by a threshold difference. For example, the variation between extrinsic parameters for Group 1 and the extrinsic parameters for Group 2 must be less than or equal to a threshold difference. As an example, the rotation parameters in Group 1 extrinsics cannot vary from the rotation parameters in Group 2 extrinsics by more than a threshold amount. As another example, the variation between successive extrinsic parameters may be limited to a threshold of 2-3 mm in translation and/or 1-2 arc minutes in rotation. Variations below the threshold do not impact the quality of 3D reconstruction of the surroundings through the sensors, therefore making the overall impact on system performance imperceptible to the human eye.

To calibrate the headset system, the extrinsic parameter information, pose information, and reference point information is used to perform optimization using the following equations:

$$e_{r_{ijk}} = \left(\prod (\theta_k P_j X_i - z_i)\right), \text{ such that } k = trigger_j$$

-continued $$e_r = \sum_{k,j,k} e_{r_{ijk}}^T \Omega_{r_{ijk}} e_{r_{jk}}$$

$$e_{\theta_j} = \log(\theta_{j-1}^{-1} \theta_j) j \in \{1, 2, 3, \ldots\}, \text{ where } \theta_0 = \text{factory}$$

$$e_\theta = \sum_j e_{\theta_j}^T \Omega_{\theta_j} e_{\theta_j}$$

In the equations noted above, X refers to the reference point, P refers to the pose, theta (θ) corresponds to the extrinsic parameter, J refers to the pose count, K refers to the extrinsic parameter count, and i refers to the reference mapping point count. In some implementations, the initial miscalibration trigger can be set by default according factory settings. The above equations can be used to calculate the error in the rotation, $e_r$, and translation $e_\theta$ values.

After the optimization, the processor can calibrate the cameras using the optimized error values to correct the alignment of cameras in the headset system arising out of elastic deformations. This operation can minimize the total reprojection error with respect to all 3D image points and camera parameters. In some implementations, calibration parameters for the left and right projection subsystems of the display systems can also be determined and applied to the projection subsystems to ensure alignment of displayed images (e.g., to minimize image degradation when virtual content is to be displayed along with images captured by the cameras.)

Figure 5:
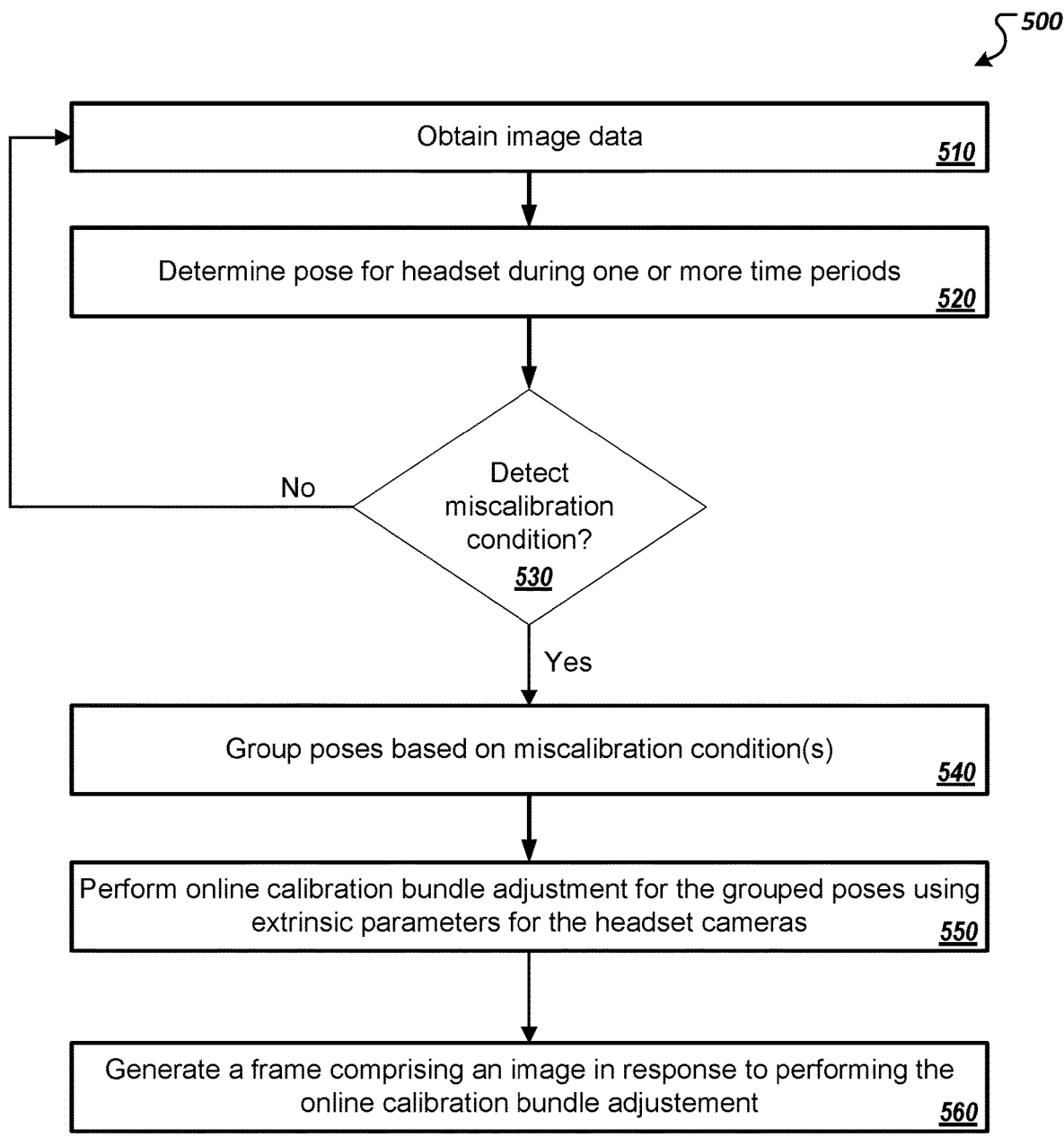
FIG. 5 depicts an example flow chart of a method for performing sensor calibration and bundle adjustment.

FIG. 5 depicts a flowchart of a method for performing SCBA. The method can be performed by one or more processors (hereinafter after referred to as processor) of a headset system as described above with respect to FIGS. 1 and 2.

In operation 510, the processor can obtain image data from the cameras on the headset system. In some implementations, the headset system can include two cameras, one facing forward on a left side of the headset system and a second facing forward on a right side of the headset system. The cameras can be spaced equidistant apart from a central point of the headset frame.

The image data may be obtained over several periods of time during which the headset moves. In addition to the image data, the processor may obtain data from one or more sensors of the headset system. As the headset system moves, the headset poses can be determined using the image data and data received from the sensors (operation 520). Headset poses can be determined based on one or more reference mapping points in images rendered during the periods of time when image data was obtained. For each pose, the processor can determine position and orientation values for each camera of the headset relative to one or more map reference points. In some implementations, a headset pose can be determined for each selected frame of image data, and a subset of poses can be selected for calibration purposes.

While collecting image data, the processor can also detect whether a miscalibration condition has occurred using data received from the sensors and cameras of the headset system (operation 530). Examples of miscalibration conditions have been described above, and include, e.g., a headset being placed on or taken off a user's head, a location of the headset being changed, a fluctuation in an ambient temperature surrounding the headset, a fluctuation in a temperature of the headset, and a mechanical displacement of a portion of the headset.

When a miscalibration condition has occurred, the processor can divide the obtained poses and associated optimization nodes and reference points into groups based on miscalibration conditions or one or more criterion (operation 540). For example, in some implementations, the processor can determine a first time that a first miscalibration condition occurred, identify all the poses prior to the first time at which the first miscalibration condition occurred; and group the poses prior to the first time into a first pose group.

In some implementations, if a second miscalibration condition has also occurred, the processor can determine a second time that a second miscalibration condition occurred and identify all poses that occurred after the first time and before the second time at which the second miscalibration condition occurred. The processor can then group the poses between the first time and the second time into a second pose group.

As shown in FIG. 4, the groups of poses can have different number of poses. In some implementations, the headset system can have a maximum or minimum limit on the number of poses, reference map points, or time period for any group of poses.

Although not shown in FIG. 5, in some implementations, poses can be grouped in response to the generation of a calibration trigger signal. As described above, a calibration trigger signal can be generated when certain conditions are satisfied, such as when a threshold amount of computational resources are available, when a user request to perform calibration is received, after a certain period of time has elapsed, at scheduled times, or after a certain amount of data has been obtained from the sensors and/or cameras.

After the poses are grouped in operation 540, the processor can perform bundle adjustment for each group of poses (550). In performing bundle adjustment, the processor can determine separate extrinsic parameters for each group. The determined extrinsic parameters are constrained such that successive extrinsic parameters cannot vary beyond a particular threshold amount. For example, the rotation parameter of a first extrinsic cannot vary from a rotation parameter of a second extrinsic more than a rotation threshold amount, e.g., 2 arc minutes. As another example, the translation parameter of the first extrinsic cannot vary from a translation parameter of the second extrinsic more than a translation threshold amount, e.g., 3 mm.

Using the extrinsic parameters described above and the poses and reference points, the rotational and translational error of the headset system's cameras can be optimized. The optimization involves minimizing the error in the position and orientation of the cameras to align the cameras in the headset system to a set of mapping reference points in an augmented reality image. In this manner, calibration for all the poses in a single group is performed jointly, but each group of poses has a separate set of calibration data.

After optimizing the rotational and translational error, the alignment and/or orientation of the cameras are calibrated to remove the error. To do so, the processor can send one or more control signals to the cameras with data indicative of how much the alignment and/or orientation of the cameras should be adjusted.

In response to performing the above-described SCBA, the controller can transmit a signal to the display system of the headset system to generate a frame (operation 560). The frame includes an image that should not suffer from errors due to elastic deformations because the errors were compensated for by performing the SCBA method.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented using one or more computer programs or non-transitory computer-readable storage media that includes instructions that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example, semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

Computer-readable medium may be a machine-readable storage device, a machine-readable storage substrate, a memory device, a composition of matter effecting a machine-readable propagated signal, or a combination of one or more of them. The term "processor" encompasses all apparatus, devices, and machines for processing data, including by way of example a programmable processor or multiple processors. The apparatus may include, in addition to hardware, code that creates an execution environment for the computer program in question, e.g., code that constitutes processor firmware, a protocol stack, a database management system, an operating system, or a combination of one or more of them. A propagated signal is a generated signal, e.g., a machine-generated electrical, optical, or electromagnetic signal that is generated to encode information for transmission to suitable receiver apparatus.

A computer program, also known as a program, software, software application, script, plug-in, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may, in some cases, be excised from the combination, and the claimed combination may be directed to a sub-combination or variation of a sub-combination.

Similarly, the separation of various system components in the embodiments described above should not be understood as requiring such separation in all embodiments, and it should be understood that the described program components and systems may generally be integrated together.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

What is claimed is:

1. A method comprising:
   obtaining image data from a plurality of cameras of a headset, including obtaining image data at different times as the headset moves through a series of poses of the headset;
   detecting that one or more miscalibration conditions for the headset have occurred as the headset moved through the series of poses;
   dividing the series of poses into groups of poses based on the one or more miscalibration conditions;
   performing bundle adjustment for the groups of poses using a separate set of camera calibration data for each group of poses of the groups of poses, wherein the bundle adjustment for a set of poses in each group of poses is performed using a same set of calibration data for each group of poses, and wherein the separate set of camera calibration data for each group of poses is estimated jointly with bundle adjustment estimation for the set of poses in each group of poses, and comprising:
      optimizing the separate set of camera calibration data for each group of poses to align the headset to a set of mapping reference points in an augmented reality image, comprising:
         applying a first constraint that limits a difference between rotation parameters of the separate set of camera calibration data for two groups of poses of the groups of poses to be less than a rotation threshold; and
         applying a second constraint that limits a difference between translation parameters of the separate set of camera calibration data for two groups of poses of the groups of poses to be less than a translation threshold; and
   changing one or more of an alignment and an orientation of one or more of the plurality of cameras based on the bundle adjustment to calibrate the headset.

2. The method of claim 1, wherein obtaining the image data at different times as the headset moves through the series of poses of the headset comprises:
   determining position and orientation values for each camera of the headset relative to a map reference point for each pose of the headset.

3. The method of claim 1, wherein obtaining the image data at different times as the headset moves through the series of poses of the headset comprises:
   determining a pose of the headset for each selected frame of image data; and
   selecting a subset of poses as the series of poses.

4. The method of claim 1, wherein detecting that the one or more miscalibration conditions for the headset have occurred comprises one or more of:
   determining that the headset has been placed on or taken off of a user's head;
   determining that a location of the headset has changed;
   detecting a fluctuation in an ambient temperature surrounding the headset;
   detecting a fluctuation in a temperature of the headset; and
   detecting a mechanical displacement of a portion of the headset.

5. The method of claim 1, wherein dividing the series of poses into the groups of poses comprises:
   determining a first time that a first miscalibration condition occurred;
   identifying all poses of the headset prior to the first time when the first miscalibration condition occurred; and
   grouping the poses of the headset prior to the first time into a first pose group.

6. The method of claim 5, wherein dividing the series of poses into the groups of poses comprises:
   determining a second time that a second miscalibration condition occurred;
   identifying all poses of the headset after the first time and prior to the second time when the second miscalibration condition occurred; and
   grouping the poses of the headset between the first time and the second time into a second pose group.

7. The method of claim 6, wherein a number of poses in the second pose group is different from a number of poses in the first pose group.

8. The method of claim 1, wherein performing the bundle adjustment for the groups of poses using the separate set of camera calibration data for each group of poses comprises:
   determining a separate extrinsic parameter for each group of poses, the separate extrinsic parameter comprising at least two matrices of rotation and translation parameter values associated with at least two cameras of the headset.

9. The method of claim 1, wherein:
   the rotation threshold is 2 arc minutes; and
   the translation threshold is 3 mm.

10. The method of claim 1, comprising:
    displaying the augmented reality image at a display of the headset in response to calibration of the headset.

11. A virtual or augmented reality system, comprising:
    a headset comprising a display device configured to display an augmented reality image and cameras configured to obtain image data for rendering the augmented reality image; and
    a processor coupled to the headset, the processor configured to:
       obtain the image data from the cameras, including image data obtained at different times as the headset moves through a series of poses of the headset;
       detect that one or more miscalibration conditions for the headset have occurred as the headset moved through the series of poses;
       divide the series of poses into groups of poses based on the one or more miscalibration conditions;
       perform bundle adjustment for the groups of poses using a separate set of camera calibration data for each group of poses of the groups of poses, wherein the bundle adjustment for a set of poses in each group of poses is performed using a same set of calibration data for each group of poses, and wherein the separate set of camera calibration data for each group of poses is estimated jointly with bundle adjustment estimation for the set of poses in each group of poses, and comprising:
    optimize the separate set of camera calibration data for each group of poses to align the headset to a set of mapping reference points in the augmented reality image, comprising:
        apply a first constraint that limits a difference between rotation parameters of the separate set of camera calibration data for two groups of poses of the groups of poses to be less than a rotation threshold; and
        apply a second constraint that limits a difference between translation parameters of the separate set of camera calibration data for two groups of poses of the groups of poses to be less than a translation threshold; and
  change one or more of an alignment and an orientation of one or more of the cameras based on the bundle adjustment to calibrate the headset.

12. The virtual or augmented reality system of claim 11, wherein to obtain the image data at different times as the headset moves through the series of poses of the headset, the processor is configured to:
  determine a pose of the headset for each selected frame of image data; and
  select a subset of poses as the series of poses.

13. The virtual or augmented reality system of claim 11, wherein to divide the series of poses into the groups of poses, the processor is configured to:
  determine a first time that a first miscalibration condition occurred;
  identify all poses of the headset prior to the first time when the first miscalibration condition occurred;
  group the poses of the headset prior to the first time into a first pose group;
  determine a second time that a second miscalibration condition occurred;
  identify all poses of the headset after the first time and prior to the second time when the second miscalibration condition occurred; and
  group the poses of the headset between the first time and the second time into a second pose group.

14. The virtual or augmented reality system of claim 11, wherein to perform the bundle adjustment for the groups of poses using the separate set of camera calibration data for each group of poses, the processor is configured to:
  determine a separate extrinsic parameter for each group of poses, the separate extrinsic parameter comprising at least two matrices of rotation and translation parameter values associated with at least two cameras of the headset.

15. A non-transitory computer-readable storage medium comprising instructions, which, when executed by one or more processors, cause the one or more processors to perform operations comprising:
  obtaining image data from a plurality of cameras of a headset, including obtaining image data at different times as the headset moves through a series of poses of the headset;
  detecting that one or more miscalibration conditions for the headset have occurred as the headset moved through the series of poses;
  dividing the series of poses into groups of poses based on the one or more miscalibration conditions;
  performing bundle adjustment for the groups of poses using a separate set of camera calibration data for each group of poses of the groups of poses, wherein the bundle adjustment for a set of poses in each group of poses is performed using a same set of calibration data for each group of poses, and wherein the separate set of camera calibration data for each group of poses is estimated jointly with bundle adjustment estimation for the set of poses in each group of poses, and comprising:
    optimizing the separate set of camera calibration data for each group of poses to align the headset to a set of mapping reference points in an augmented reality image, comprising:
        applying a first constraint that limits a difference between rotation parameters of the separate set of camera calibration data for two groups of poses of the groups of poses to be less than a rotation threshold; and
        applying a second constraint that limits a difference between translation parameters of the separate set of camera calibration data for two groups of poses of the groups of poses to be less than a translation threshold; and
  changing one or more of an alignment and an orientation of one or more of the plurality of cameras based on the bundle adjustment to calibrate the headset.

16. The non-transitory computer-readable storage medium of claim 15, obtaining the image data at different times as the headset moves through the series of poses of the headset comprises:
  determining a pose of the headset for each selected frame of image data; and
  selecting a subset of poses as the series of poses.

17. The non-transitory computer-readable storage medium of claim 15, wherein dividing the series of poses into the groups of poses comprises:
  determining a first time that a first miscalibration condition occurred;
  identifying all poses of the headset prior to the first time when the first miscalibration condition occurred;
  grouping the poses of the headset prior to the first time into a first pose group;
  determining a second time that a second miscalibration condition occurred;
  identifying all poses of the headset after the first time and prior to the second time when the second miscalibration condition occurred; and
  grouping the poses of the headset between the first time and the second time into a second pose group.

18. The non-transitory computer-readable storage medium of claim 15, wherein performing the bundle adjustment for the groups of poses using the separate set of camera calibration data for each group of poses comprises:
  determining a separate extrinsic parameter for each group of poses, the separate extrinsic parameter comprising at least two matrices of rotation and translation parameter values associated with at least two cameras of the headset.

* * * * *